United States Patent [19]

Gooding et al.

[11] Patent Number: 6,036,764
[45] Date of Patent: Mar. 14, 2000

[54] YELLOW PIGMENT BLEND FOR HOT MELT TRAFFIC MARKINGS

[75] Inventors: Kim Diane Gooding; James Martin Delaney, both of Wilmington, Del.

[73] Assignee: Ciba Specialty Chemicals Corporation, Tarrytown, N.Y.

[21] Appl. No.: 09/095,837

[22] Filed: Jun. 11, 1998

Related U.S. Application Data

[60] Provisional application No. 60/053,002, Jun. 13, 1997.

[51] Int. Cl.[7] .................................................. C09D 5/00
[52] U.S. Cl. ........................ 106/440; 106/479; 106/498; 106/31.04; 106/31.6; 106/31.61; 523/172; 524/408
[58] Field of Search .................... 106/440, 479, 106/498, 31.04, 31.6, 31.61; 523/172; 524/408

[56] References Cited

U.S. PATENT DOCUMENTS

| | | | |
|---|---|---|---|
| 3,337,483 | 8/1967 | Searight et al. | 106/175.1 |
| 3,900,605 | 8/1975 | Norris, Jr. | 427/137 |
| 4,324,711 | 4/1982 | Tanaka et al. | 106/31.04 |
| 4,406,706 | 9/1983 | Dale | 106/400 |
| 4,690,958 | 9/1987 | Lacoste et al. | 523/172 |
| 5,472,737 | 12/1995 | Anders | 427/137 |
| 5,736,602 | 4/1998 | Crocker et al. | 524/494 |

FOREIGN PATENT DOCUMENTS

| | | |
|---|---|---|
| 993135 | 7/1976 | Canada . |
| 2051822 | 1/1981 | United Kingdom ................ 106/31.04 |
| 2259515 | 3/1993 | United Kingdom . |

OTHER PUBLICATIONS

Chemical Abstract No. 92:148707, abstract of Japanese Patent Specification No. 54–160433. (Dec. 1979).
Chemical Abstract No. 130:67847, abstract of PCT International Application No. 98/56862. (Dec. 1998).
Derwent Abstract 76–67759X, abstract of Japanese Patent Specification No. 51–083638 (Jul. 1976).

*Primary Examiner*—Anthony Green
*Attorney, Agent, or Firm*—David R. Crichton

[57] ABSTRACT

The present invention relates to a yellow pigment blend containing a) a yellow nickel titanate pigment, b) a yellow bismuth vanadate, and c) a yellow isoindolinone pigment, wherein a hardened pigmented article resulting from the blend is characterized according to the CIE tristimulus values system by having a value for Y of at least about 36, a value for x between 0.48 and 0.51 and a value for y between 0.44 and 0.47. The yellow pigment blend has very good heat resistance for hot melt application and very good lightfastness for long term durability.

11 Claims, No Drawings

YELLOW PIGMENT BLEND FOR HOT MELT TRAFFIC MARKINGS

This application claims the benefit under 35 U.S.C. 119(e) of U.S. Provisional Application No. 60/053,002, Filed Jun. 13, 1997.

BACKGROUND OF THE INVENTION

The present invention relates to a yellow pigment blend that may be used in traffic markings, particularly hot melt traffic striping. The resulting markings have very good heat resistance, light fastness, and meet applicable transportation regulations for color and retroreflectance.

Traffic markings can be applied to roadway paving surfaces by various methods, including hot spraying/extruding and via hot melt formulations. The methods and equipment used for applying traffic markings are well-known. Other paint formulations are usually solvent-based, though efforts to develop water-borne traffic markings have been initiated. A hot melt formulation typically contains a pigment blend and a polymeric carrier that has been liquefied. Specially designed equipment applies a layer of the liquid hot melt formulation over the road surface. The applied hot melt formulation layer is allowed to cool and thereby bond with the road surface to produce a permanent or semi-permanent traffic stripe or marking.

Traditional traffic paints use lead and hexavalent chrome pigments, which are toxic to plants, animals and humans and are subject to strict environmental regulation. Hence, an object of the present invention is to produce a lead and chrome-free yellow pigment blend that may be used to produce traffic markings.

Conventional organic pigment blends, when subjected to a hot melt heat test (temperatures of 400 to 450° F. for a period of four hours), decompose and discolor. Accordingly, a further object of the present invention is a pigment blend that may be used in hot melt traffic markings, as evidenced by passing the hot melt heat test.

A further objective of the present invention is to obtain a blend of pigments having color properties complying with Federal, state, and local regulations for yellow traffic signals.

Other objects and advantages of the present invention will be clear to those skilled in the art upon closer inspection of the following disclosure.

SUMMARY OF THE INVENTION

The present invention relates to a yellow pigment blend comprising a) a yellow nickel titanate pigment, b) a yellow bismuth vanadate, and c) a yellow isoindolinone pigment, wherein a hardened pigmented article resulting from the blend is characterized according to the CIE tristimulus values system by having a value for Y of at least about 36, a value for x between 0.48 and 0.51 and a value for y between 0.44 and 0.47. The yellow nickel titanate pigment in the pigment blend is preferably Pigment Yellow 53. The yellow bismuth vanadate in the pigment blend is preferably Pigment Yellow 184. The yellow isoindolinone pigment in the pigment blend is preferably Pigment Yellow 110.

The yellow pigment blend preferably contains about 45% to about 75% by weight of component (a), about 10% to about 30% by weight of component (b) and about 5% to about 25% by weight of component (c), based on the total weight of the blend. In a more preferred embodiment, component (a) is present in the amount of about 55% to about 70% by weight, component (b) is present in the amount of about 15% to about 25% by weight, and component (c) is present in the amount of about 10% to 20% by weight. In a most preferred embodiment, the pigment blend comprises about 63% by weight of component (a), about 23% by weight of component (b), and about 14% by weight of component (c).

The present invention further relates to a hot melt traffic marking formulation comprising: a) a resin; b) yellow pigment blend as described above; c) glass beads; and d) fillers. The hot melt traffic marking formulation preferably has a retroreflectance of at least 250.

Still further, the present invention relates to a paint traffic marking formulation comprising: a) a resin; b) yellow pigment blend according to claim 1; c) glass beads; d) fillers; and e) solvent. The paint formulation preferably has a retroreflectance of at least 250.

DETAILED DESCRIPTION OF THE INVENTION

The present invention relates to a novel blend of yellow pigments that can be used in traffic marking paint, particularly hot melt traffic striping. The resulting traffic markings have good heat resistance, light fastness, good exterior durability and meet applicable transportation regulations for color and retroreflectance. Additionally, the pigment blend does not include lead or chrome-containing compounds.

The novel blend of pigments is a mixture of a yellow nickel titanate pigment, a yellow bismuth vanadate pigment and a yellow isoindolinone pigment. The yellow nickel titanate pigment is preferably Pigment Yellow 53. The yellow bismuth vanadate pigment is preferably Pigment Yellow 184. The yellow isoindolinone pigment is preferably Pigment Yellow 110. The pigment blend is formulated in conventional fashion. Fillers, carriers, and extenders may be incorporated into the pigment blend to produce a formulation suitable for application by hot spraying or via a hot melt formulation.

The yellow nickel titanate pigment is an inorganic pigment derived from a mixture of antimony oxide, nickel oxide, and titanium oxide. Preferably, the yellow nickel titanate pigment is Pigment Yellow 53. Pigment Yellow 53 is prepared by calcining a mixture of antimony oxide, nickel oxide and titanium oxide. Pigment Yellow 53 is commercially available from numerous sources, including Cerdec under the tradename of Irgacolor Yellow 10401. The yellow nickel titanate pigment is preferably not combined or reduced with titanium dioxide or other fillers.

A discussion relating to yellow nickel titanate pigments, including methods of preparation, are found in the Pigment Handbook, Vol. 1, pp. 419–427 (1973), which is incorporated herein by reference. Generally, yellow nickel titanate pigments can be made by either precipitation or by calcination. The calcination process is characterized by a mixing of the raw materials required for the particular pigment (mixing is either by dry blending or by wet milling). The mixture is then calcined at a high temperature of about 980° C. After firing, the pigment is wet milled in a ball mill. The milled product is transferred to a filter press where it is washed and then dewatered to produce a filtercake. The filtercake is then dried and passed through a micropulverizer to produce a fine powder. The final step in the manufacturing process is to blend various batches to ensure that the finished product meets the quality control specifications for the pigment. Yellow nickel titanates can also be prepared by a precipitation process using a nickel salt with titanium dioxide, which is hydrated, and antimony oxide. The mixture is dried and calcined in the same manner as for the dry blended material.

The yellow bismuth vanadate pigment has a brilliant greenish yellow shade, a high color strength and a very high opacity. The yellow bismuth vanadate pigment is commercially available from companies such as BASF and Ciba Specialty Chemicals Corporation under the tradename of Irgacolor Yellow. The yellow bismuth vanadate pigment is preferably not combined or reduced with titanium dioxide during formulation of the pigment blend. Those skilled in the art will recognize that minor amounts of fillers and extenders may be incorporated into the yellow bismuth vanadate pigment without adversely affecting the properties of a resulting pigment blend. The yellow bismuth vanadate pigment can be further combined with boric acid or surface treated with silica to enhance its dispersibility and wetting properties in conventional fashion.

The yellow bismuth vanadate pigment can be made via either a calcining process or wet process. Various calcining processes are described in U.S. Pat. No. 4,937,063, which is incorporated herein by reference. A well-known for producing yellow bismuth vanadate pigment is to calcine mixtures of oxides, or any salt which yields the corresponding oxide by thermal decomposition in the proper ratios for the desired composition. Calcining temperatures vary from about 300° to about 950° C. The optimum temperature depends upon the particular composition being prepared. The calcined product may then be subjected to wet grinding, finishing operations, and treated with texture-improving agents. Various wet processes for preparing yellow bismuth vanadate pigment are described in U.S. Pat. Nos. 5,186,748 and 5,399,335, which are incorporated herein by reference. A yellow bismuth vanadate pigment may alternatively be produced via a wet process by reaction, precipitation, and isolation of the bismuth pigment crystals. The resulting pigment is then subjected to finishing operations, and may be treated with texturing improving agents.

The yellow isoindolinone pigment is selected from a class of high performance heterocyclic yellows that contain a heterocyclic molecule within their structure. Preferably, the molecule is substituted with a halogen, such as chlorine, and not subject to a surface treatment. The most preferred yellow isoindolinone pigment is Pigment Yellow 110, which is an organic pigment derived from tetrachlorisoindolinone Yellow represented by the following structure:

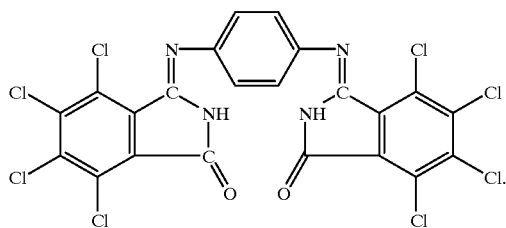

Pigment Yellow 110 is a red-shifted yellow pigment having good heat resistance, good exterior durability. Pigment Yellow 110 is commercially available from a number of sources, including Ciba Specialty Chemicals Corporation under the tradename of Irgazin Yellow 3RTLN.

The yellow isoindolinone pigment can be made by condensing two equivalents of 4,5,6,7-tetrachloroisoindoline-1-one derivatives with one equivalent of an aromatic diamine in an organic solvent. Suitable tetrachloroisoindoline-1-one derivatives are substituted in the 3-position, which is occupied either by two monovalent groups or one divalent group. The monovalent group typically is a chloro atom or methoxy group. The divalent group usually represents an NH moiety. The reaction sequences for preparing Pigment Yellow 110 and its corresponding starting materials are well known as exemplified in Industrial Organic Pigments, Production, Properties, Applications by Herbst, which is incorporated herein by reference. Pages 400–404 therein relate to the chemistry, synthesis and starting materials for tetrachloroisoindolinone pigments.

The instant blend comprises a) the yellow nickel titanate pigment, b) the yellow bismuth vanadate pigment, and c) the yellow isoindolinone pigment. The blend contains about 45% to about 75% by weight of component (a), about 10% to about 30% by weight of component (b) and about 5% to about 25% by weight of component (c), based on the total weight of the blend. More preferably, component (a) is present in the amount of about 55% to about 70% by weight, component (b) is present in the amount of about 15% to about 25% by weight, and component (c) is present in the amount of about 10% to about 20% by weight. Most preferably, the blend comprises about 63% by weight of component (a), about 23% by weight of component (b), and about 14% by weight of component (c).

The yellow pigments employed in the instant blend are conventionally available in powder form. Effective amounts of the yellow nickel titanate pigment, the yellow bismuth vanadate pigment, and the yellow isoindolinone pigment are combined in cone blenders or mixers to produce the instant blend. A cone blender with beater bars is preferred. The constituents are blended in the cone blender until a homogenous mixture is obtained. The resulting homogenous mixture may optionally be passed through a mesh sieve to eliminate clumps of pigment.

The resulting yellow pigment blend can be modified to produce a paint formulation or a hot melt formulation to be applied to a road surface. The paint or hot melt formulation comprises a) a resin and plasticizers, b) the yellow pigment blend described, c) glass beads, d) fillers, and optionally, and if a paint formulation, e) organic solvent or water. The hot melt resin is present in the amount of about 15% to 25% by weight of the formulation. The yellow pigment blend is present in the formulation in the amount of about 2% to about 10% by weight. The glass beads are present in the amount of about 15 to about 25% by weight of the formulation. The fillers and solvent, if present, constitute the remainder of the formulation.

In modifying the yellow pigment blend to produce a paint or hot melt formulation, the yellow pigment blend is intimately combined with the resin, glass beads, fillers, and solvents, if present. For example, the blend can be combined with alkyd resins, plasticizers, catalysts, extenders, solvent (for paint formulation only), such as toluene, methanol, methyl ethyl ketone, and mixtures thereof, clays, calcium carbonate, and diatomaceous earth, glass beads, surfactants, and dispersants.

The resulting paint and hot melt formulations can be formulated to meet all applicable transportation regulations relating to yellow traffic markings. The CIE tristimulus values system is a well-known colors standard. According to the tristimulus values system, every color is broken down into three components relating to color lightness and chromacity. A color's lightness is defined by a "Y" tristimulus value. A color's chromacity is defined by "x" and "y" tristimulus values. Paint and hot-melt formulations also may exhibit a particular level of retroreflectance. Instrumentation for measuring retroreflectance, such as Mirrolux 12, is also commercially available.

While each state has published regulations for the yellow traffic markings, the federal regulations issued in 1965 by the United States government for work on federal projects is representative. According to these regulations, a yellow traffic marking must be characterized in the tristimulus value system as:

Y greater than 36.20;

x between 0.48 and 0.51; and y between 0.44 and 0.47.

More preferably, Y is greater than 45. Most preferably, Y is greater than 48. Additionally, yellow traffic marking must exhibit a particular level of retroreflectance of at least 250, more preferably greater than 280.

The practice of this invention will be better understood by reference to the following non-limiting illustrative example. The following percentages or parts are expressed in percentages or parts by weight unless otherwise indicated. All color designations are based on the CIE tristimulus values system unless otherwise indicated.

EXAMPLE 1

Preparation of Yellow Pigment Blend and Hot Melt Formulation

A representative yellow pigment blend is prepared by combining 63% by weight of Pigment Yellow 53, 23% by weight of Pigment Yellow 184 and 14% by weight of Pigment Yellow 110 with a premade resin mixture. The premade resin mixture comprises an aliphatic hydrocarbon resin, wax, extender, calcium carbonate, plasticizer, and glass beads. The pigment blend is approximately 3% by weight of the overall pigment mixture. The resulting pigment mixture is shaken on a Red Devil shaker for approximately 5 minutes and then melted on a hot plate. The melted mixture is stirred with a cowles blade on an air mixer for approximately 15 minutes until the temperature of the mixture reaches 204° C. In order to determine the color properties of a hardened pigmented article resulting from the resulting hot melt formulation, a portion of the hot melt formulation is placed in a circular mold. The selected hot melt formulations are allowed to cool and harden in the mold. The resulting hardened pigment articles are removed from the mold and tested in a spectrophotometer to determine the color properties of the blend. The resulting hardened articles have the following tristimulus values: Y=48; x=0.48; y=0.44.

The mixture has very good heat resistance and very good lightfastness, relative to a lead chromate formulation.

While the invention has been illustrated by means of an example, it will be apparent that further modifications and variations are possible without departing from the spirit and scope of the invention, which is defined by the appended claims.

We claim:

1. A yellow pigment blend comprising effective amounts of a) a yellow nickel titanate pigment; b) a yellow bismuth vanadate, and c) a yellow isoindolinone pigment, wherein a pigmented article containing said yellow pigment blend has, as measured according to the CIE tristimulus values system, a value for Y of at least 36.2, a value for x between 0.48 and 0.51 and a value for y between 0.44 and 0.47.

2. A yellow pigment blend according to claim 1 wherein the yellow nickel titanate pigment is Pigment Yellow 53.

3. A yellow pigment blend according to claim 1 wherein the yellow bismuth vanadate is Pigment Yellow 184.

4. A yellow pigment blend according to claim 1 wherein the yellow isoindolinone pigment is Pigment Yellow 110.

5. A yellow pigment blend according to claim 1 containing about 45% to about 75% by weight of component (a), about 10% to about 30% by weight of component (b) and about 5% to about 25% by weight of component (c), based on the total weight of the blend.

6. A yellow pigment blend according to claim 5 wherein component (a) is present in the amount of about 55% to about 70% by weight, component (b) is present in the amount of about 15% to about 25% by weight, and component (c) is present in the amount of about 10% to 20% by weight.

7. A yellow pigment blend according to claim 6 wherein the blend comprises about 63% by weight of component (a), about 23% by weight of component (b), and about 14% by weight of component (c).

8. A hot melt traffic marking formulation comprising:

a) a resin; b) yellow pigment blend comprising effective amounts of a) a yellow nickel titanate pigment; b) a yellow bismuth vanadate, and c) a yellow isoindolinone pigment,; c) glass beads; and d) fillers, wherein a resulting traffic marking containing said yellow pigment blend has, as measured according to the CIE tristimulus values system, a value for Y of at least 36.2, a value for x between 0.48 and 0.51 and a value for y between 0.44 and 0.47.

9. A paint traffic marking formulation comprising:

a) a resin; b) yellow pigment blend comprising effective amounts of a) a yellow nickel titanate pigment; b) a yellow bismuth vanadate, and c) a yellow isoindolinone pigment,; c) glass beads; d) fillers and e) solvent, wherein a resulting traffic marking containing said yellow pigment blend has, as measured according to the CIE tristimulus values system, a value for Y of at least 36.2, a value for x between 0.48 and 0.51 and a value for y between 0.44 and 0.47.

10. A hot melt traffic marking formulation according to claim 8 having a retroreflectance of at least 250.

11. A paint formulation according to claim 9 having a retroreflectance of at least 250.

* * * * *